United States Patent [19]
Seigendall

[11] Patent Number: 5,499,852
[45] Date of Patent: Mar. 19, 1996

[54] SECOND HANDLE ATTACHMENT FOR A TOOL

[76] Inventor: Jay R. Seigendall, 13804 E. 27th Ave., Spokane, Wash. 99216

[21] Appl. No.: 404,327

[22] Filed: Mar. 15, 1995

[51] Int. Cl.⁶ .................................. A01B 1/22; B25G 3/38
[52] U.S. Cl. ............................................ 294/58; 294/54.5
[58] Field of Search ............................. 294/54.5, 57, 58, 294/59; 16/114 R, 115; 15/145; 37/265, 285

[56] References Cited

U.S. PATENT DOCUMENTS

| | | | |
|---|---|---|---|
| 4,050,728 | 9/1977 | Davidson | 16/114 R |
| 4,128,266 | 12/1978 | Vaslas | 294/58 |
| 4,200,324 | 4/1980 | Helton . | |
| 4,231,604 | 11/1980 | Obergfell . | |
| 4,537,433 | 8/1985 | Yang | 294/58 |
| 4,787,661 | 11/1988 | Rutledge | 294/58 |
| 4,944,541 | 7/1990 | Waldschmidt . | |
| 5,133,582 | 7/1992 | Rocha . | |
| 5,400,471 | 3/1995 | Lichfield et al. | 294/58 |
| 5,411,305 | 5/1995 | Revoldt | 294/58 |

FOREIGN PATENT DOCUMENTS

| | | | |
|---|---|---|---|
| 2481870 | 11/1981 | France | 294/58 |
| 568515 | 4/1945 | United Kingdom | 294/58 |

Primary Examiner—Dean Kramer
Attorney, Agent, or Firm—David S. Thompson

[57] ABSTRACT

A second handle attachment for a tool having a handle shaft, such as a shovel, is disclosed. The second handle attachment provides a grip portion that a user may grab so that the shovel may be used without the user bending over. In this manner, back injury and strain is reduced. The second handle attachment provides two clamshell brackets which are bolted into a rigid relationship with the tool's handle shaft. The attachment also provides a rotating second handle that may be locked into place at any of several angular relationships with the tool handle shaft. The second handle provides a grip portion that is typically covered by a plastic or rubber grip cover. The second handle attachment may be transferred among any type of shovel, rake, snow shovel, hoe or pitch fork. It may be adjusted up or down the handle shaft, to accommodate taller or shorter users. It may be rotated to accommodate right-handed, left-handed or ambidextrous users. A bushing is provided so that the second handle attachment may be used with a light weight rake having a smaller diameter handle shaft, as well as a shovel having a larger diameter handle shaft.

4 Claims, 3 Drawing Sheets

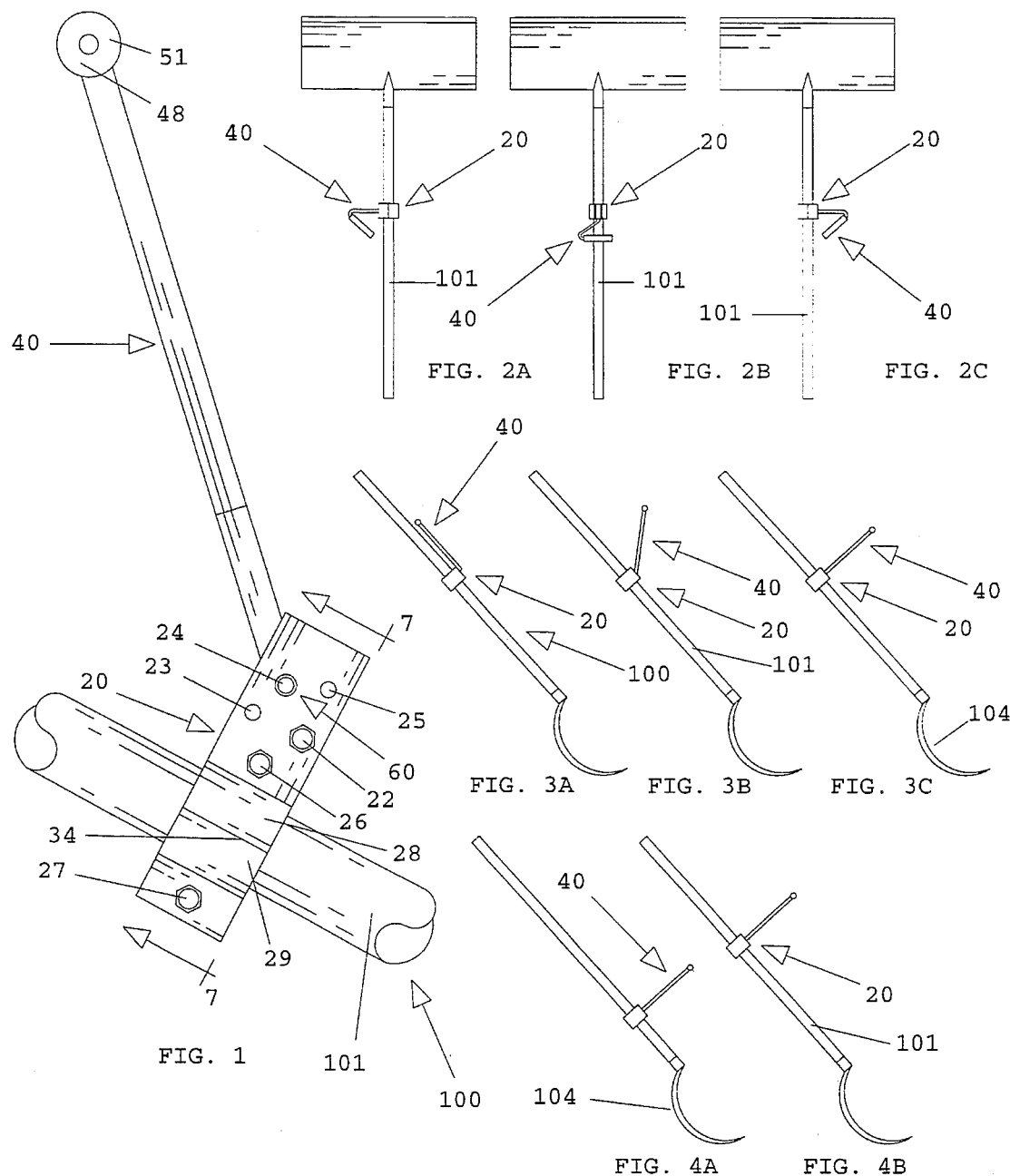

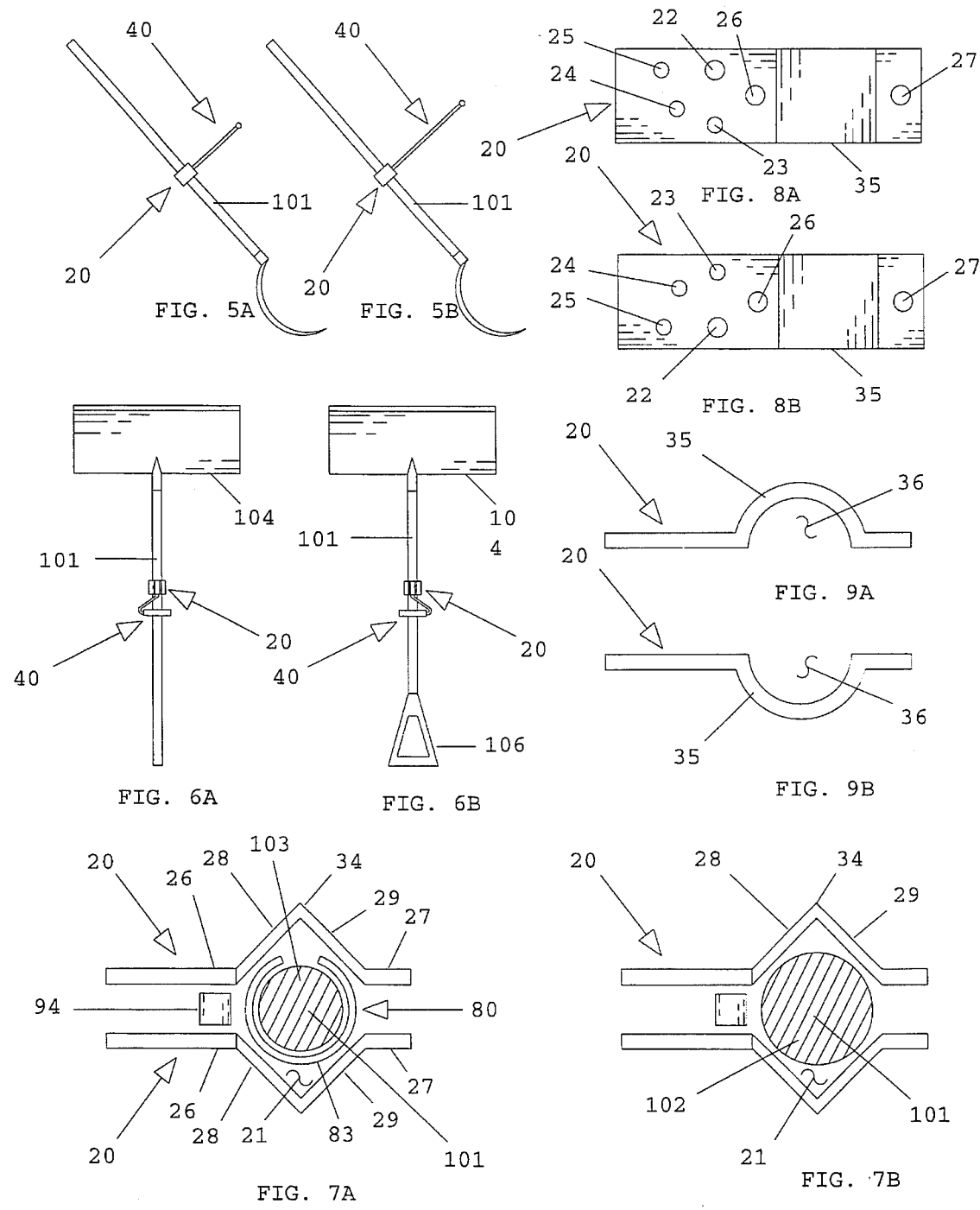

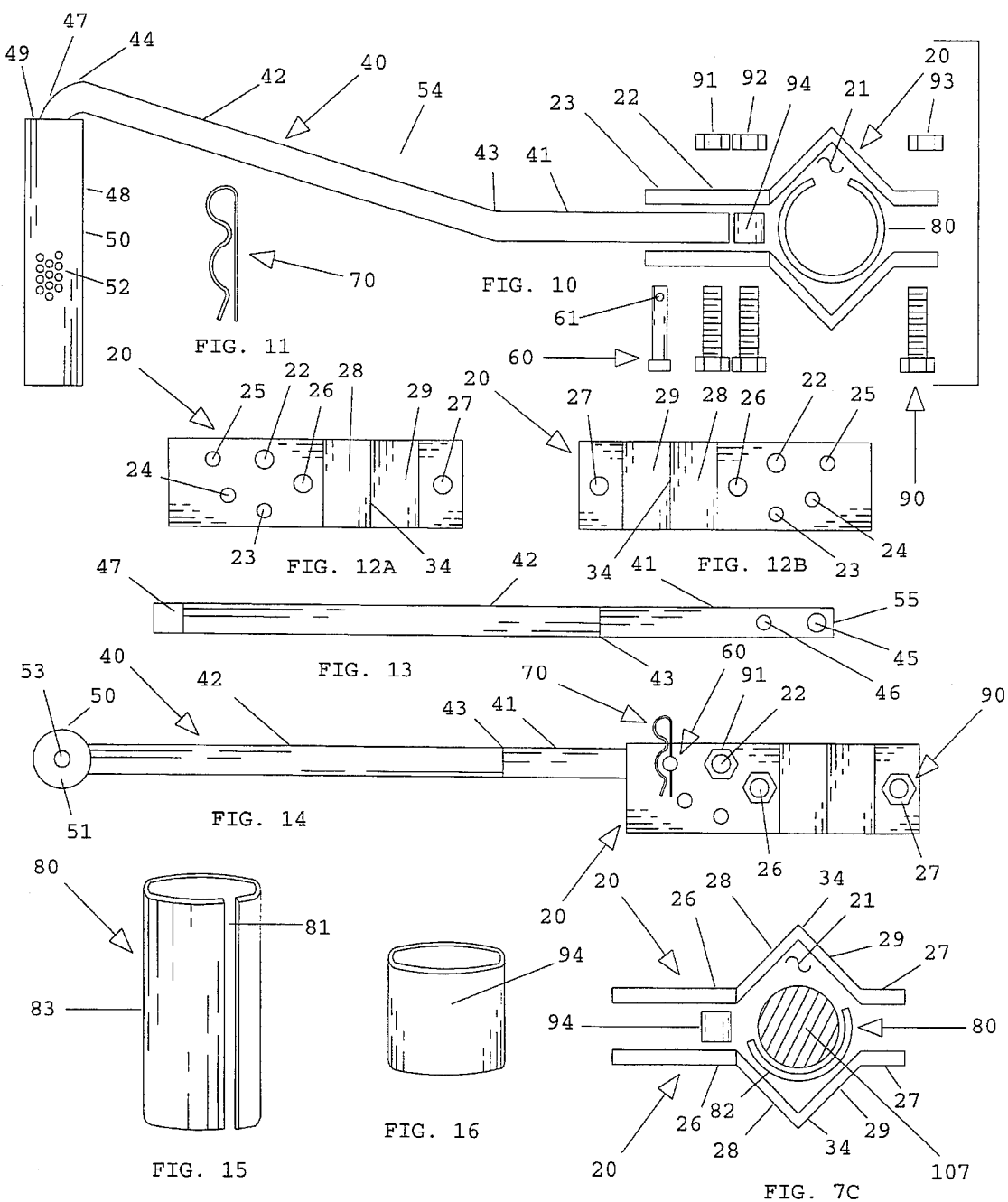

SECOND HANDLE ATTACHMENT FOR A TOOL

BACKGROUND

It has been known that two-handled shovels, particularly snow shovels, provide a second handle that allows the user to lift without bending at the waist and to therefore use leg muscles rather than back muscles. As a result, considerable strain and possible injuries are avoided.

Despite the considerable health advantages of a two-handled shovel, and the stress and strain that may be avoided by its use, few two-handled shovels are actually used and sold on the commercial market. One reason may be that the public still remains generally ignorant of the advantages of a second handle, but other reasons include the unwillingness of the public to buy tools with non-removable second handles or to buy new tools with second handles to replace existing tools without second handles. Additionally, the inability of most second handles to adjust to fit both the user and the job makes them only marginally better than no second handle at all.

Two-handled shovels that have been disclosed to date generally provide advantages to the user, but frequently present problems not present in an unmodified shovel. Often the construction of two-handled shovels tends to weaken the shovel itself, by requiring that holes be drilled, or other modifications made, in the handle shaft to attach the second handle. Other two-handled shovels tend to weigh substantially more than before modified, and most make no provision for the user to use the shovel in its unmodified manner, if desired. Often either no provision is made to accommodate left-handed users, or the second handle may be a compromise between left- and right-handed users, and not particularly well-suited for use by either. Some other two-handled shovel designs fail to provide a means for the user to adjust the location of attachment of the second shovel up or down the primary handle of the shovel, to accommodate the height of the user.

For the foregoing reasons, there is a need for an attachment, adaptable for use with any existing shovel, snow shovel, rake, hoe, pitchfork or other tool already owned by a user, that may be used to provide a second handle. The attachment should be removable, and easily installed on a second tool. The attachment should provide a means to adjust between left-handed, right-handed and neutral positions. The attachment should be adjustable up and down the tool's handle shaft between locations appropriate to tall or short users. The attachment should be adjustable between tools having a narrow handle shaft diameter and tools having a wider handle shaft diameter. The attachment should allow adjustment of the angle between the second handle and the primary handle. The attachment should be extremely strong, and inexpensive to manufacture.

SUMMARY

The present invention is directed to an apparatus that satisfies the above needs. A novel second handle attachment is disclosed that is usable with any tool, such as a snow shovel, shovel, or pitch fork, having a handle shaft.

The second handle attachment of the present invention provides:

(a) Left and right clamshell brackets, each bracket having:
  (a) A notch structure. When the brackets are put face-to-face the notch structures form an opening that wraps around a tool's handle shaft, and may be clamped against that shaft.
  (b) A pivot hole. When the brackets are put face-to-face the pivot holes line up, and support a pivot bolt.
  (c) A locking pin hole. The brackets' locking pin holes also line up and support a locking pin.
(b) A second handle having a body portion and a grip portion, the grip portion typically with a grip cover. The second handle also provides a pivot hole and a locking pin hole. The second handle may be pivoted freely on the pivot bolt between the clamshell brackets until the locking pin is installed.
(c) A locking pin, which is carried in the clamshell brackets' pin holes and by the locking pin hole in the second handle. When the locking pin is installed, the second handle is prevented from pivoting with respect to the brackets.
(d) Bolts to bias the clamshell brackets together, thus squeezing the shovel's (or other tool's) handle shaft, and fixing the second handle attachment onto the shovel. A preferred version of the second handle attachment of the present invention also provides:
(a) Left and right clamshell brackets having either a V-shaped or a semicircular-shaped notch structure, so that when the brackets are face-to-face, the opening between the brackets will be approximately square or approximately round.
(b) A cotter pin hole in the locking pin, and a cotter pin to pass through that hole. The locking pin prevents rotation of the second handle. The cotter pin prevents the locking pin from becoming dislodged.
(c) A bushing to be used to increase the diameter of a tool's handle shaft having a smaller diameter. The bushing provides a hollow, cylindrical body having a lengthwise slit, and may be flexed to adapt to various smaller diameter tool handle shafts.
(d) A spacer, having a hollow, cylindrical body, incrementally longer than the thickness of the second handle. The spacer is used on one of the bolts biasing the clamshells together, to prevent the clamshells from clamping down on the end of the second handle, in the area of the second handle pivot hole and locking pin hole. Thus the spacer allows the second handle to pivot between the clamshell brackets (when the locking pin is removed).

It is therefore a primary advantage of the present invention to provide a novel second handle attachment that is adaptable to a variety of tools having handle shafts such as shovels, rakes, snow shovels, pitch forks, hoes and long handled tree trimmers or window washing tools.

Another advantage of the present invention is to provide a second handle attachment that allows use of a shovel or other tool without bending over, and therefore reduces lower back strain and related problems.

Another advantage of the present invention is to provide a second handle attachment that allows use with existing tools, already owned by the user.

Another advantage of the present invention is to provide a second handle attachment that is attachable to long handled tree trimming and window washing equipment that allows the user to obtain the leverage needed to better control such equipment.

Another advantage of the present invention is to provide a second handle attachment that adjusts up and down the handle shaft of the tool, to allow adjustment for the height of the user.

Another advantage of the present invention is to provide a second handle attachment that adjusts in a rotary manner about the handle shaft of the tool, to allow adjustment for left-handed, right-handed or ambidextrous users.

Another advantage of the present invention is to provide a second handle attachment having a second handle that pivots so that the angle between the second handle and the handle shaft of the tool may be fixed at a desired position.

Another advantage of the present invention is to provide a second handle attachment having one or more bushings that can be used to adapt the handle shaft of the tool to a diameter appropriate for use by the second handle attachment.

A still further advantage of the present invention is to provide a second handle attachment that is economical to manufacture and of extremely rugged construction.

DRAWINGS

These and other features, aspects, and advantages of the present invention will become better understood with regard to the following description, appended claims, and accompanying drawings where:

FIG. 1 shows a side view of the second handle attachment of the invention attached to a portion of a handle shaft of a tool;

FIGS. 2A, 2B and 2C show overhead views of the second handle attachment attached to a snow shovel, illustrating the ability of the second handle attachment to rotate between left- and right-handed positions;

FIGS. 3A, 3B, and 3C show side views of the second handle attachment attached to a snow shovel, illustrating the ability of the second handle attachment to pivot to adjust the angle of the second handle with respect to the handle shaft of the tool;

FIGS 4A and 4B show views of the second handle attachment attached to a snow shovel, illustrating the ability of the second handle attachment to be adjusted up and down the handle shaft of a tool, to compensate for users' different heights;

FIGS. 5A and 5B show side views of the second handle attachment attached to a snow shovel, illustrating how longer or shorter second handle bodies may create different versions of the second handle attachment of the invention;

FIGS. 6A and 6B show top views of the second handle attachment attached to a snow shovel, illustrating a further means by which the second handle attachment of the invention may be adjusted to compensate for left- or right-handed users, and also illustrating a snow shovel with a D-shaped handle;

FIGS. 7A , 7B and 7C are sectional views of the version of the invention of FIG. 1, taken on the 7—7 line, having the second handle and bolts removed for clarity, illustrating the use of a bushing to adjust for tool handle shafts of differing diameters;

FIGS. 8A and 8B are side views of left and right clamshell brackets of a second version of the invention, having semicircularly shaped notch structures;

FIGS. 9A and 9B are top views of the clamshell brackets of FIG. 8, showing how the semicircularly shaped notch structures form a generally circular opening when the brackets are arrayed face-to-face;

FIG. 10 show an exploded top view of the second handle attachment;

FIG. 11 shows a side view of the cotter pin used to secure the locking pin;

FIGS. 12A and 12B show side views of the left and right clamshell brackets of the version of the invention of FIG. 1, having V-shaped notch structures;

FIG. 13 shows a side view of the second handle without a handle grip cover,

FIG. 14 shows a side view of the second handle attachment;

FIG. 15 shows a perspective view of the bushing of FIG. 7A; and

FIG. 16 shows a perspective view of the spacer seen in FIGS. 7 and 10.

DESCRIPTION

As seen in particular in FIGS. 1 and 10, the second handle attachment of the present invention provides a handle structure that is attachable to the handle of a shovel, snow shovel, rake hoe, pitch fork or other similar tool. The second handle attachment provides left and right clamshell brackets 20 which grip a handle shaft 101 of a tool 100. A second handle 40 is held between the clamshell brackets and may be pivoted between three positions, each having a different angle with respect to the handle shaft 101, where the handle 40 may be locked into place by means of a locking pin 60. FIG. 1 shows a side view of the second handle attachment carried by a tool 100 having a handle shaft 101. FIG. 10 shows an exploded view of the second handle attachment, to better show the relationship of the various components.

As seen in FIGS. 7 and 12, a first version of the invention provides clamshell brackets 20 having a generally square opening 21 that is formed by a V-shaped notch structure 34. A second version of the invention provides clamshell brackets 20 having a generally round opening 36 that is formed by a semicircular notch structure 35, and is seen in FIGS. 8 and 9. The clamshell brackets of both versions of the invention are made from 3/16" thick zinc plated steel having a width of 1.5 inches and a length, before bending the notch structure 34, 35, of approximately 5 inches.

The square opening 21, formed by the V-shaped notch structure 34, is best seen in FIGS. 7A, 7B, and 7C, where the opening 21 is formed between left and right clamshell brackets when they are face-to-face, as they are in these figures.

A right clamshell bracket 20, having a V-shaped notch structure 34, is seen in FIG. 12A. A V-shaped notch structure 34 provides an inner angle portion 28 and an outer angle portion 29. A pivot hole 22, sized to accept a 5/16 inch bolt, is an equal distance from three locking pin holes 23, 24, and 25, which are sized to accept a 1/4 inch locking pin.

Pin hole 23 is positioned, as seen in FIG. 12A, so that when second handle 40 is attached to both pivot hole 22 and locking pin hole 23 the handle is perpendicular to the bracket 20, and parallel to a handle shaft 101 (not shown) gripped by the bracket. Similarly, locking pin hole 24 is positioned so that when second handle 40 is attached to both pivot hole 22 and pin hole 24 the handle is at 45 degrees to the bracket 20. And finally, locking pin hole 25 is positioned, as seen in FIG. 12A, so that when second handle 40 is attached to both pivot hole 22 and pin hole 25 the handle is in-line with the bracket 20, and perpendicular to a handle shaft (not shown) gripped by the bracket.

Inner securing bolt hole 26 and outer securing bolt hole 27 are located on either side of V-shaped notch structure 34 and are sized to accept 5/16 inch bolts.

A left clamshell bracket 20, having a V-shaped notch structure 34, is seen in FIG. 12B. This bracket is the mirror image of the right clamshell bracket 20 of FIG. 12A having a V-shaped notch structure.

A right clamshell bracket 20, having a semicircularly shaped notch structure 35, is seen in FIG. 8A. This version of the invention differs only from the V-shaped notch version in that the notch is semicircular. A left clamshell bracket 20, having a semicircularly shaped notch structure 35, is seen in FIG. 8B. This bracket is the mirror image of the right clamshell bracket 20 of FIG. 8A having a semicircular shaped notch structure.

As seen in FIG. 10, the left and right clamshell brackets 20 are put together by means of nut and bolt pairs 90, or alternatively by a similar fastening device. The bolts used are 5/16 inch diameter bolts 1 13/8 inches long, having 18 threads per inch. The nuts used have a nylon bush locking mechanism. The bolts include a pivot bolt 91, a spacer bolt 92, and a tightening bolt 93. The pivot bolt 91 goes through pivot hole 45 of the second handle 40 and pivot holes 22 of the left and right brackets 20. The spacer bolt goes through the cylindrical spacer 94 and the inner securing bolt hole 26 of each bracket 20. The tightening bolt 93 goes through outer securing bolt hole 27 of each bracket 20, and is the bolt primarily used to tighten the brackets 20 about the handle shaft 101 of a tool 100, The second handle 40 is seen in top view in FIG. 10, and in side view in FIGS. 13 and 14. The handle 40 is made from approximately 16 inches of steel having a 0.5 inch square cross section. A comparison of the views of the handle seen in FIGS. 10 and 13 reveal that the handle 40 is generally constructed in one plane.

As seen in FIG. 10, the second handle 40 pivots between the clamshell brackets about pivot bolt/nut 91. The second handle 40 provides a handle grip portion 47 and a body portion 54. The body 54 provides a straight end portion 41, an angled bend 43, an angled middle portion 42, and a 90 plus degree bend 44. A locking pin hole 46 is drilled near the end of the straight portion 41, as seen in FIG. 13, and a pivot hole 45 is drilled between the locking pin hole 46 and the end 55 of the handle 40.

The second handle 40 may be fixed in place, to prevent rotation. As seen in FIG. 10, a locking pin 60, having a head, a cylindrical body, and a cotter pin hole 61 in the body opposite the head, is sized to fit into any of the locking pin holes 23, 24, 25 in the brackets 20, and through the locking pin hole 46 in the second handle 40. A cotter pin 70, seen in FIGS. 11 and 14, is used to keep the locking pin 60 in place.

A plastic or rubber grip cover 48, similar to those used on bicycle handlebars, is put on the grip portion 47 of the second handle 40. The grip cover 48 provides a body 50, having an open end 49 and a closed end 51. The closed end 51 provides an air hole 53 so that air may be exhausted when the grip is installed. Typically, however, grip cover 48 will be cylindrical in design, and will not need the air hole when installed over the handle grip portion 47, which is one-half inch square in cross section. A tread pattern 52 is typically provided, to increase the user's frictional grip on the second handle 40. The grip cover 48 is typically put on the steel handle grip portion 47 by first applying an evaporative rubber or plastic lubricant. Next, an air ram tool is used to force the grip cover 48 over the handle grip portion 47. Alternatively, a rubber mallet may be used to install the grip covers.

A spacer 94 is used to keep the spacer nut/bolt 92 from pinching the brackets 20 against the area about the pivot hole 45 of the straight portion 41 of the body 54 of the handle 40. As seen in FIG. 10, the length of the spacer is approximately equal to, or incrementally greater than, the width of the second handle 40. As seen in FIG. 16, the spacer is a short cylindrical tube. It is made of steel and is typically zinc plated to resist corrosion.

To accommodate tools 100 having handle shafts 101 of differing diameters, bushings 80 are provided. A generally cylindrical bushing 83, having a lengthwise slit 81, is seen in FIG. 15, and in cross-section in FIG. 10. A half-cylindrical bushing 82 is seen in cross-section in FIG. 7C. Both bushings are typically made from pvc pipe having a schedule 40 thickness, although a variety of similar materials would serve adequately. The slit 81 in the bushing 83 allows the bushing to be adapted, by flexing it slightly, to handle shafts of differing cross-sections. The half-cylindrical bushing 82 increases the handle shaft 101 diameter somewhat less that the notched cylindrical bushing 83.

To use the second handle attachment of the invention, the user must assemble the second handle attachment generally as seen in FIG. 10. Depending on whether the user is left- or right-handed, either of the configurations illustrated in FIGS. 6A or 6B may be preferable. These two figures differ in that the angled middle portion 42 of the second handle 40 is on the left in FIG. 6A, and on the right in FIG. 6B. Every individual user should decide which is preferable, and assemble the second handle 40 between the clamshell brackets 20 with the pivot bolt/nut 91 in the appropriate manner.

The user must then evaluate the diameter of the handle shaft 101 of the tool 100 being used. If the handle shaft 101 is of larger diameter 102, such as seen in FIG. 7B, then no bushing is needed. If the handle shaft is of smaller diameter 103, such as seen in FIG. 7A, then a cylindrical bushing 83 should be placed over the handle shaft. If the handle diameter is of intermediate diameter 107, such as seen in FIG. 7C, then a half bushing 82 should be used. The bushing (if any) should be selected so that the handle shaft 101 may be held firmly between the clamshell brackets 20, when nut/bolt combinations 92, 93 are tightened. Spacer nut/bolt 92 tightens the brackets 20 against the spacer, while tightening nut/bolt 93 creates a highly frictional fit between the brackets and the handle shaft 101.

If a D-shaped handle 106, such as the one seen in FIG. 6B is present, the user must actually remove the tightening nut/bolt 93 and separate the left and right clamshell brackets prior to mounting the brackets on the handle shaft 101. If no D-shaped handle is present, the bracket may be loosened slightly, and slipped over the end of the handle shaft 101.

Referring to FIGS. 4A and 4B, the user must then slide the second handle attachment up and down the handle shaft 101, until it is a comfortable distance from the tool implement 104 (shovel, rake, hoe, etc.). Factors that may influence the decision on how far from the tool implement 104 the second handle attachment should be include the height of the user and the type of tool and use involved.

Referring to FIGS. 2A, 2B and 2C, the user must determine the angle of rotation about the handle shaft 101 of the tool 100. The angle may be influenced by whether the user is left- or right-handed, and also by whether the user intends to switch hand positions during use. The top-view of the snow shovel of FIG. 2A shows the configuration appropriate to use by a user who intends to use his left hand on the second handle. The top-view of FIG. 2C would be appropriate for use of the right hand on the second handle. FIG. 2B would be appropriate if the user intends to switch hand positions during use. The user then tightens the bolts, thereby securing the second handle attachment to the tool's handle shaft.

Referring to FIGS. 3A, 3B and 3C, the user may alter the angle of the second handle 40 with respect to the handle shaft 101. With the locking pin 60 removed, the user simply pivots the handle 40 until the locking pin hole 46 lines up with either locking pin hole 23, 74, or 25. The user then inserts the locking pin 60 into the appropriate locking pin hole until the cotter pin hole 61 appears on the other side. The user then inserts the cotter pin 70 into the cotter pin hole 61.

Alternatively, the second handle attachment may be used without locking the handle in place, although this is not recommended.

Once attached, the user holds the grip cover 48 with the hand that would otherwise be used to grip the handle shaft nearer the tool implement. In the case of a shovel or a snow shovel, the user lifts up on the second handle attachment. In the case of a rake or hoe, the user pushes down. In either case, the user does not bend over, as would be the case without the second handle attachment.

The previously described versions of the present invention have many advantages, including the ability to attach the second handle attachment to the handle shaft of any tool. The second handle attachment will adjust for differing diameters of handle shafts. It will adjust up or down the handle shaft to accommodate the height of the user. It will rotate about the handle shaft to accommodate left- or right-handed users, or users who intend to alternate hands. The angle of the second handle to the handle shaft may also be adjusted.

Although the present invention has been described in considerable detail and with reference to certain preferred versions, other versions are possible. For example a variety of opening shapes could be used (other than the generally square opening created by use of V-shaped notch structures and the generally circular opening created by the use of semicircular shaped notch structures) by means of differently shaped clamshell brackets. As seen in FIGS. 5A and 5B, a second handle 40 having a longer or shorter body 54 may be used. Also, locking pin 60 could itself be locked into place by a structure other than cotter pin 70. For example, the locking pin could be replaced by a nut and bolt. FIG. 5 also illustrates, in a general sense, that alterations of the relative dimensions of the second handle attachment may be made, if desired or needed. Therefore, the spirit and scope of the appended claims should not be limited to the description of the preferred versions contained here.

What is claimed is:

1. A second handle attachment for connection to a tool having a handle shaft, comprising:
   (a) left and right clamshell brackets, each bracket comprising a pivot hole, a locking pin hole, an inner securing bolt hole, an outer securing bolt hole, and a notch structure;
   (b) a second handle comprising:
      (a) a straight end portion having a pivot hole and a locking pin hole, the distance from the pivot hole to the locking pin hole equal to the distance between the pivot hole and locking pin hole of the left and right clamshell brackets;
      (b) an angled middle portion; and
      (c) a handle grip portion;
   (c) a locking pin, carded by the locking pin holes of the left and right clamshell brackets and by the locking pin hole of the second handle, having a cotter pin hole;
   (d) locking means for releasably securing the locking pin comprising a cotter pin carried by the cotter pin hole of the locking pin; and
   (e) biasing means for biasing the left and right clamshell brackets togethers, whereby the handle shaft of the tool is firmly held, comprising:
      (a) an inner securing bolt carried by the inner securing bolt holes of the left and right clamshell brackets;
      (b) a spacer having an inner diameter that is incrementally greater than the outer diameter of the inner securing bolt and a length that is incrementally greater than the thickness of the second handle, carried by the inner securing bolt in a position between the left and right clamshell brackets, whereby the second handle may rotate even when the inner securing bolt is tightened; and
      (c) an outer securing bolt carried by the outer securing bolt holes of the left and right clamshell brackets.

2. The second handle attachment of claim 1, in which the second handle additionally comprises a grip cover, carried by the handle grip portion.

3. The second handle attachment of claim 1, additionally comprising bushing means for encasing the handle shaft of a tool to increase its diameter.

4. A second handle attachment for connection to a tool having a handle shaft, comprising:
   (a) left and right clamshell brackets, each bracket having a pivot hole, a locking pin hole, an inner securing bolt hole, and an outer securing bolt hole, the brackets further comprising a notch structure;
   (b) a second handle comprising:
      (a) a straight end portion having a pivot hole and a locking pin hole, a the distance from the pivot hole to the locking pin hole equal to the distance between the pivot hole and locking pin hole of the left and right clamshell brackets;
      (b) an angled middle portion;
      (c) a handle grip portion; and
      (d) a grip cover, carried by the handle grip portion;
   (c) a locking pin, carried by the locking pin holes of the left and right clamshell brackets and by the locking pin hole of the straight end portion of the second handle, having a cotter pin hole;
   (d) locking means for releasably securing the locking pin comprising a cotter pin carried by the cotter pin hole of the locking pin;
   (e) means for biasing the left and right clamshell brackets together to hold the handle shaft of a tool firmly comprising:
      (a) an inner securing bolt carried by the inner securing bolt holes of the left and right clamshell brackets;
      (b) a spacer having an inner diameter that is incrementally greater than the outer diameter of the inner securing bolt and a length that is incrementally greater than the thickness of the second handle, carried by the inner securing bolt in a position between the left and right clamshell brackets, whereby the second handle may rotate even when the inner securing bolt is tightened; and
      (c) an outer securing bolt carried by the outer securing bolt holes of the left and right clamshell brackets; and
   (f) bushing means for encasing the handle shaft of a tool to increase its diameter.

* * * * *